United States Patent
Usude (10) Patent No.: US 10,272,509 B2
(45) Date of Patent: Apr. 30, 2019

(54) GEAR CUTTING MACHINE AND METHOD

(71) Applicant: MITSUBISHI HEAVY INDUSTRIES MACHINE TOOL CO., LTD., Ritto-shi, Shiga (JP)

(72) Inventor: Junji Usude, Tokyo (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 0 days.

(21) Appl. No.: 15/570,454

(22) PCT Filed: Jun. 15, 2016

(86) PCT No.: PCT/JP2016/067724
§ 371 (c)(1),
(2) Date: Oct. 30, 2017

(87) PCT Pub. No.: WO2017/056573
PCT Pub. Date: Apr. 6, 2017

(65) Prior Publication Data
US 2018/0141142 A1   May 24, 2018

(30) Foreign Application Priority Data
Sep. 28, 2015  (JP) .................. 2015-189221

(51) Int. Cl.
*B23F 5/16*  (2006.01)
*B23F 21/10*  (2006.01)
*B23F 23/12*  (2006.01)

(52) U.S. Cl.
CPC ............... *B23F 5/163* (2013.01); *B23F 5/16* (2013.01); *B23F 21/10* (2013.01); *B23F 23/1206* (2013.01); *B23F 23/1231* (2013.01)

(58) Field of Classification Search
CPC .. B23F 5/163; B23F 5/16; B23F 21/10; B23F 23/1206
See application file for complete search history.

(56) References Cited

U.S. PATENT DOCUMENTS

| 3,931,754 A | 1/1976 | Nishijima et al. |
| 2014/0234043 A1* | 8/2014 | Nakahara ................. B23F 5/20 409/12 |
| 2015/0228961 A1 | 8/2015 | Park |

FOREIGN PATENT DOCUMENTS

| JP | 48-86197 A | 11/1973 |
| JP | 2015-58505 A | 3/2015 |

(Continued)

OTHER PUBLICATIONS

International Search Report dated Sep. 6, 2016 in International Application No. PCT/JP2016/067724.

(Continued)

*Primary Examiner* — Alan Snyder
(74) *Attorney, Agent, or Firm* — Birch, Stewart, Kolasch & Birch, LLP (57) ABSTRACT

A gear cutting machine for gear cutting a workpiece (W) using a gear shaped cutter (17), by engaging and rotating the workpiece (W) that can rotate around a workpiece axis and a gear shaped cutter (17) that can rotate around a cutter axis, while cutting and feeding the gear shaped cutter (17), including:
rough cutting at a cross axis angle to the cutter axis, then moving the cutter axis by moving a predetermined angle around the workpiece axis, and performing finish cutting such that the cutter axis has an angle with regard to the workpiece axis in a plane that includes the feeding axis direction and the cutting direction after moving.

4 Claims, 10 Drawing Sheets

(56) References Cited

FOREIGN PATENT DOCUMENTS

| JP | 5864035 B1 | 2/2016 |
| WO | WO 2015/040899 A1 | 3/2015 |
| WO | WO 2015/182264 A1 | 12/2015 |

OTHER PUBLICATIONS

Written Opinion dated Apr. 12, 2018 in International Application No. PCT/JP2016/067724 with an English Translation.

* cited by examiner

GEAR CUTTING MACHINE AND METHOD

TECHNICAL FIELD

The present invention relates to a gear cutting machine and method.

BACKGROUND ART

Currently, when performing gear cutting of stepped gears or internal gears that cannot be hob machined, gear shaper machining using a pinion cutter and broach machining using a helical broach are mainstream.

However, gear shaper machining has a problem with poor productivity because the machining time is long, and broach machining has problems with high equipment costs, difficulty in adjusting the machining precision, and limits on the shape of gears that can be machined.

Therefore, Patent Literature 1 discloses a method of cutting while rotating a pinion cutter rather than a reciprocal movement, thus achieving high precision and high efficiency gear cutting.

CITATION LIST

Patent Literature

Patent Literature 1: JP-A-2015-58505

SUMMARY OF INVENTION

Technical Problems

However, the gear cutting process disclosed in Patent Literature 1 has a problem in that the same blade is repeatedly used, so the tool life is short.

Therefore, an object of the present invention is to provide a gear cutting machine and method that can perform high precision and high efficiency gear machining while extending the service life of the tool.

Solution to Problem

The gear cutting machine according to a first invention to resolve the aforementioned problem is a gear cutting machine for gear cutting gears to be cut using a gear shaped cutter, by engaging and rotating a gear to be cut that can rotate around a workpiece axis and a gear shaped cutter that can rotate around a cutter axis, while cutting and feeding the gear shaped cutter, comprising:

swiveling means for providing a crossed axis angle of the cutter axis to the workpiece axis;

cutter cutting means for moving the gear shaped cutter in the cutting direction during rough cutting, orthogonal to the workpiece axis direction;

cutter moving means for moving the gear shaped cutter in a direction orthogonal to the cutting direction and the workpiece axis direction;

cutter feeding means for moving the gear shaped cutter in the feeding axis direction parallel to the workpiece rotating axis direction; and controlling means for moving the cutter axis around the workpiece axis parallel to a predetermined angle with regard to a plane that intersects with the workpiece axis from the position of the rough cutting using the cutter cutting means and the cutter moving means, with regards to the gear to be cut that was rough cut at a crossed axis angle to the cutter axis, and controlling so that finish cutting is performed such that the cutter axis projected on a plane that includes the feeding axis direction and the cutting direction after moving has an angle with regard to the workpiece axis.

In other words, the gear cutting machine according to the first invention that resolves the aforementioned problem is a gear cutting machine for gear cutting gears to be cut using a gear shaped cutter, by engaging and rotating a gear to be cut that can rotate around a workpiece axis and a gear shaped cutter that can rotate around a cutter axis, while cutting and feeding the gear shaped cutter, comprising:

swiveling means for providing a crossed axis angle of the cutter axis to the workpiece axis;

cutter cutting means for moving the gear shaped cutter in the cutting direction during rough cutting, orthogonal to the workpiece axis direction;

cutter moving means for moving the gear shaped cutter in a direction orthogonal to the cutting direction and the workpiece axis direction;

cutter feeding means for moving the gear shaped cutter in the feeding axis direction parallel to the workpiece rotating axis direction; and controlling means for performing rough cutting to provide a cross axis angle to the cutter axis and moving the cutter axis around the workpiece axis parallel to a predetermined angle with regard to a plane that intersects with the workpiece axis from the position of the rough cutting using the cutter cutting means and the cutter moving means, and controlling so that finish cutting is performed such that the cutter axis projected on a plane that includes the feeding axis direction and the cutting direction after moving has an angle with regard to the workpiece axis.

The gear cutting machine according to the second invention that resolves the aforementioned problem is the gear cutting machine according to the first invention, wherein the blade of the gear shaped cutter is made of a plurality of cutting blades provided in a tooth trace direction, and the controlling means sets the predetermined angle such that the cutting blade or combination of cutting blades that contribute to cutting are changed for rough cutting and finish cutting.

The gear cutting method according to the third invention that resolves the aforementioned problem is a gear cutting method for gear cutting gears to be cut using a gear shaped cutter, by engaging and rotating a gear to be cut that can rotate around a workpiece axis and a gear shaped cutter that can rotate around a cutter axis, while cutting and feeding the gear shaped cutter, comprising:

rough cutting at a cross axis angle to the cutter axis, then moving the cutter axis by moving a predetermined angle around the workpiece axis, and performing finish cutting such that the cutter axis has an angle with regard to the workpiece axis in a plane that includes the feeding axis direction and the cutting direction after moving.

The gear cutting method according to the fourth invention that resolves the aforementioned problem is the gear cutting method according to the third invention, wherein the blade of the gear shaped cutter is made of a plurality of cutting blades provided in a tooth trace direction, and the predetermined angle is set such that the cutting blade or combination of cutting blades that contribute to cutting are changed for rough cutting and finish cutting.

Advantageous Effects of Invention

Therefore, the gear cutting machine and method according to the present invention can perform high precision and high efficiency gear machining while extending the service life of the tool.

DESCRIPTION OF EMBODIMENTS

The gear cutting machine and method according to the present invention are described below in detail using drawings for the embodiments.

Embodiment

Figure 1:
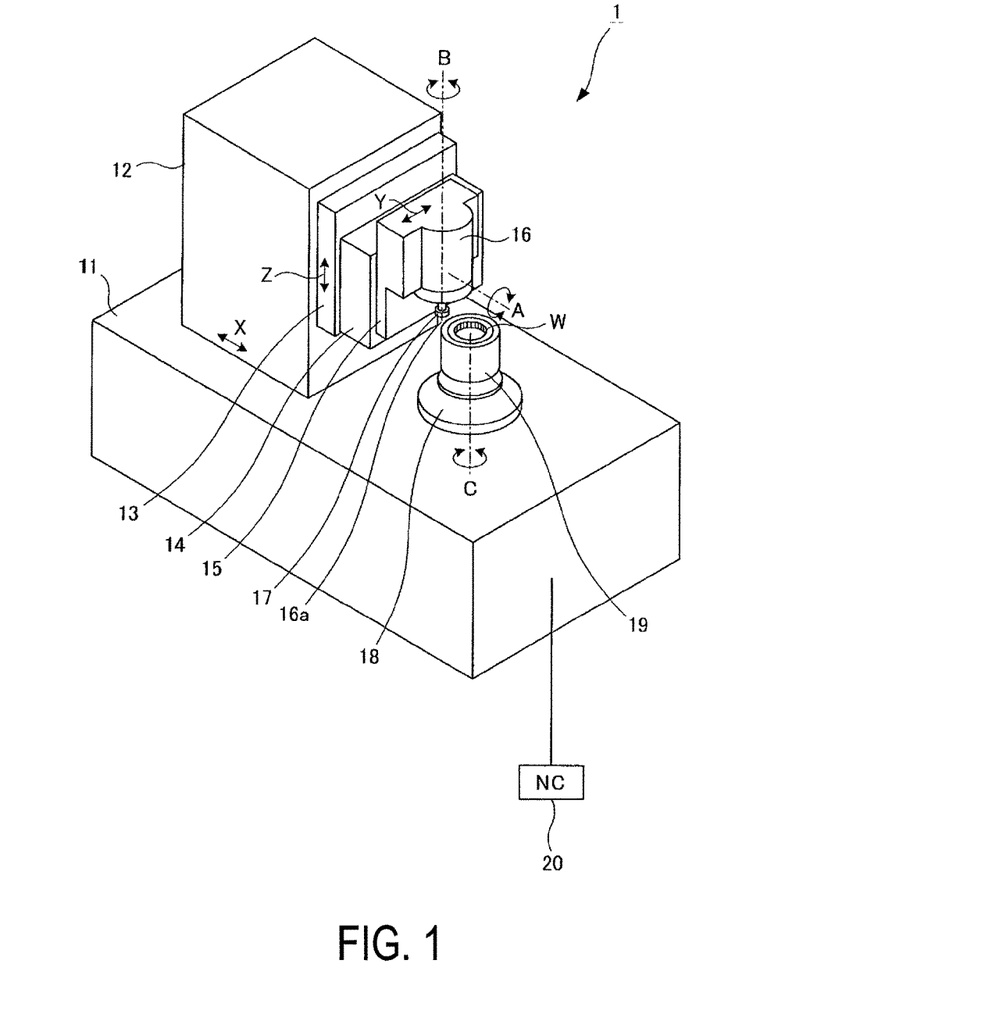
FIG. 1 is a perspective view illustrating a gear cutting machine according to an embodiment of the present invention.

As illustrated in FIG. 1, a column (cutter cutting means) 12 is movably supported in a horizontal x-axis direction (cutting depth direction (however, herein the cutting depth direction refers to the cutting depth direction of rough cutting. In the present invention, the cutting depth direction changes during finish cutting, as described below)), on the bed 11 of the gear cutting machine (gear cutting machine 1) according to the present embodiment. In addition, a saddle (cutter feeding unit) 13 is supported on the front face of the column 12 in such a manner so as to be vertically moveable in the z-axis direction (feeding direction) orthogonal to the x-axis direction. Furthermore, a swivel head (swivel unit, crossed axis angle setting unit) 14 is supported on the front face of the saddle 13 in such a manner so as to be able to swivel about the cutter swivel axis A that extends in the x-axis direction.

In addition, a slide head (cutter moving means) 15 is movably supported on the front face of the swivel head 14 in the y-axis direction which is the width direction of the gear cutting machine 1. Furthermore, a cutter head 16 is set on the front portion of the slide head 15 in a semi-circular shape from the slide head 15. Moreover, a main shaft 16a is supported in the cutter head 16 in such a manner so as to be rotatable about the cutter axis B orthogonal to the x-axis and y-axis directions. A gear shaped cutter 17 is detachably mounted on the tip end of the main shaft 16a.

Next, a rotary table (workpiece rotating unit) 18 is rotatably supported to the front surface side of the column 12 on the bed 11 so as to rotate about a workpiece axis C that extends in the z-axis direction. In addition, a cylindrical attaching jig 19 is attached to an upper face of the rotary table 18. A workpiece (internal gear to be machined) W is detachably mounted on an upper end inner circumferential surface of the attaching jig 19. Note that the center of the workpiece W and the workpiece axis C of the rotary table 18 are coaxial when the workpiece W is mounted in the fixing jig 19.

Consequently, the gear cutting machine 1 can provide cutting in the x-axis direction and feeding in the z-axis direction with regard to the cutter 17 by driving the column 12 and the saddle 13. In addition, the cutter 17 can be moved transversely in the y-axis direction by driving the slide head 15. The cutter 17 can be rotated about the cutter axis B by rotating the main shaft 16a of the cutter head 16, and the workpiece W can be rotated about the workpiece axis C by rotating the rotary table 18.

Furthermore, as illustrated in FIG. 1, the swivel angle of the cutter axis B corresponding to the rotational center of the main shaft 16a and the cutter 17 can be changed by swiveling the swivel head 14 about the cutter swivel axis A. Therefore, a crossed axis angle between the cutter axis B and the workpiece axis C can be adjusted, and the crossed axis angle is adjusted in accordance with the helix angle, or the like of the workpiece W. In other words, the crossed axis angle is the cross angle formed by the cutter axis B and the workpiece axis C within the YZ plane including the y-axis and z-axis.

Note that as described above, because the swivel head 14 is able to swivel about the cutter swivel axis A, not only the cutter axis B corresponding to the axis of the main shaft 16a and the cutter 17, but also the movement direction of the slide head 15 supported by the swivel head 14 swivels (inclines) in accordance with the swivel motion of the swivel head 14.

Furthermore, the gear cutting machine 1 has an NC controller (controlling means) 20, and driving of the column 12, saddle 13, swivel head 14, slide head 15, cutter head 16 (main shaft 16a), and rotary table 18 are controlled by the NC controller 20.

Figure 2:
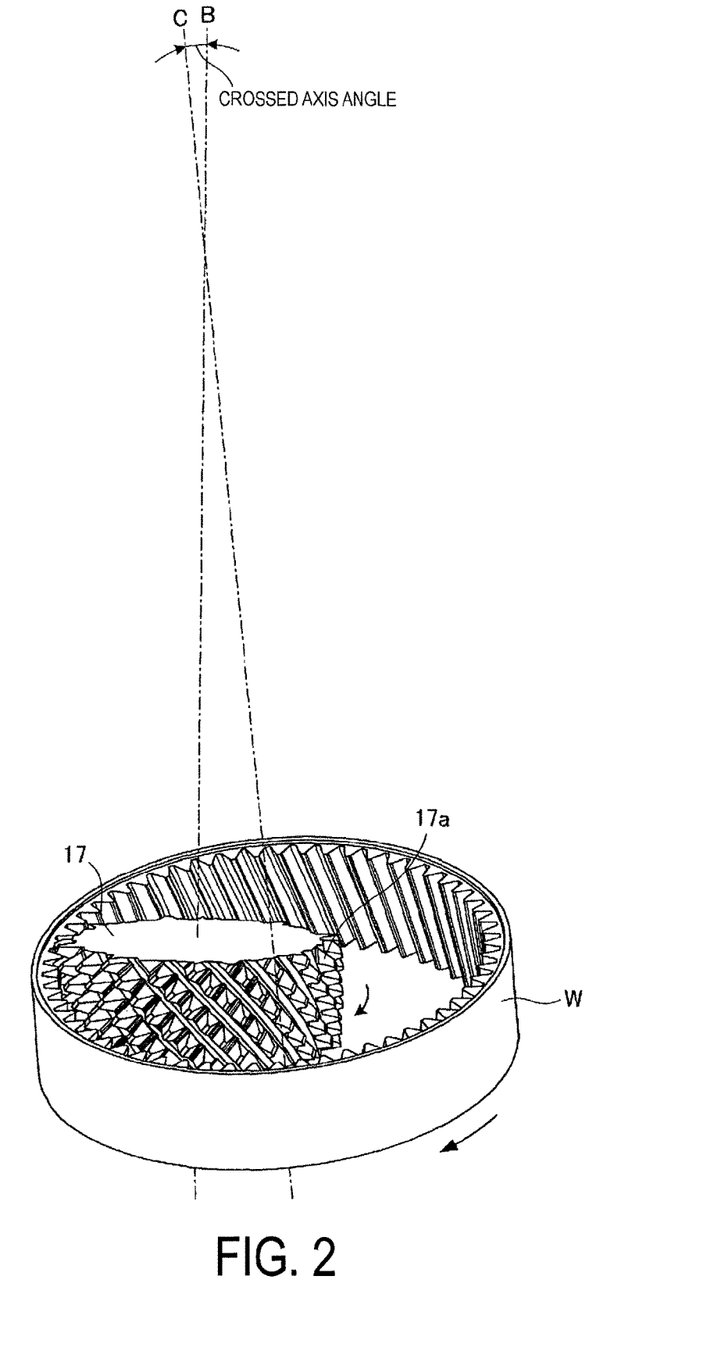
FIG. 2 is a perspective view illustrating a condition where a workpiece cutting process is performed by a cutter according to an embodiment of the present invention.

Herein, FIG. 2 is a perspective view illustrating a condition where cutting of the workpiece W is performed by the cutter 17, and in this diagram, the cutter axis B, the workpiece axis C, and the crossed axis angle formed by the cutter axis B and the workpiece axis C are illustrated. Incidentally, the two arrows in FIG. 2 indicate the direction of rotation of the cutter 17 and the workpiece W. As illustrated in FIG. 2, the cutter 17 has a multi-blade form where the blade is made of a plurality of cutting blades 17a provided in the tooth trace direction.

Figure 3:
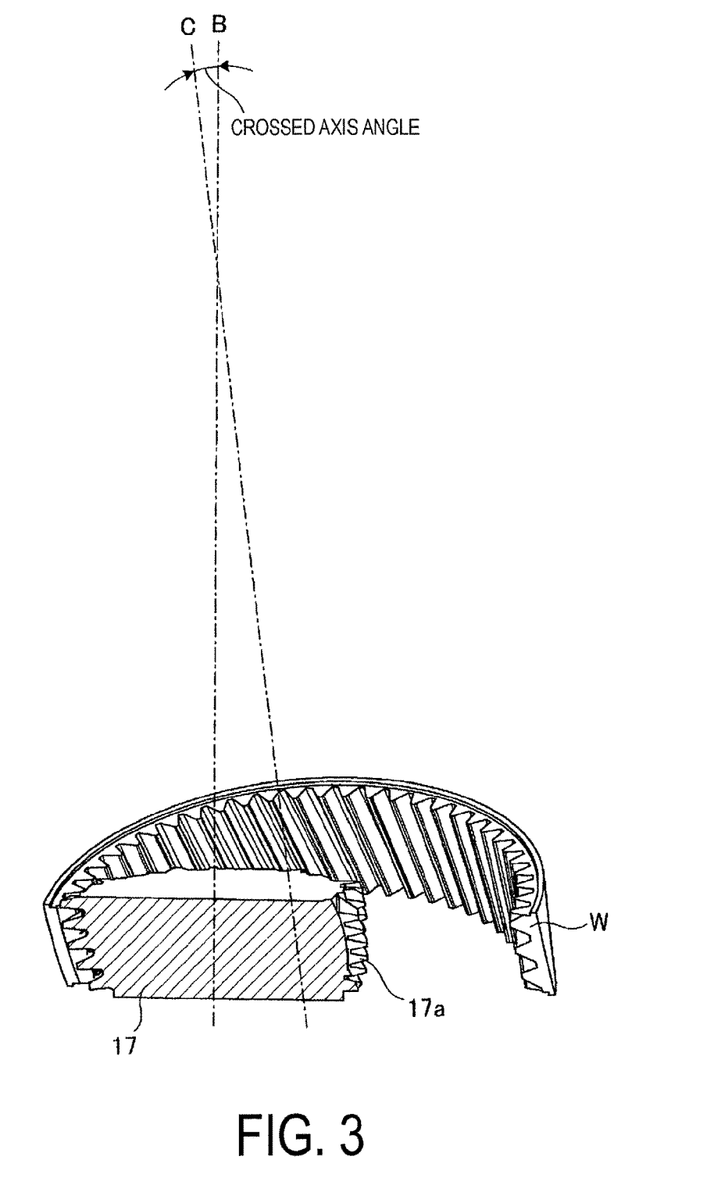
FIG. 3 is a cross-sectional view in the workpiece direction of FIG. 2.

FIG. 3 is a cross-sectional view in the workpiece axis direction in FIG. 2. As illustrated in FIG. 3, the cutter 17 has a barrel shape where the size of the diameter changes in the cutter width direction (cutter axis direction).

With the present embodiment, of the gear cutting processes, the gear cutting machine 1 performs rough cutting in the front stage, and finish cutting on the back stage. At this time, the roles of the blade on the lower side of the cutter 17 and the blade on the upper side can be allocated by changing the inclination of the cutter 17 between the rough cutting pass and the finish cutting pass. Therefore, the service life of the cutter 17 can be extended.

Figure 4:
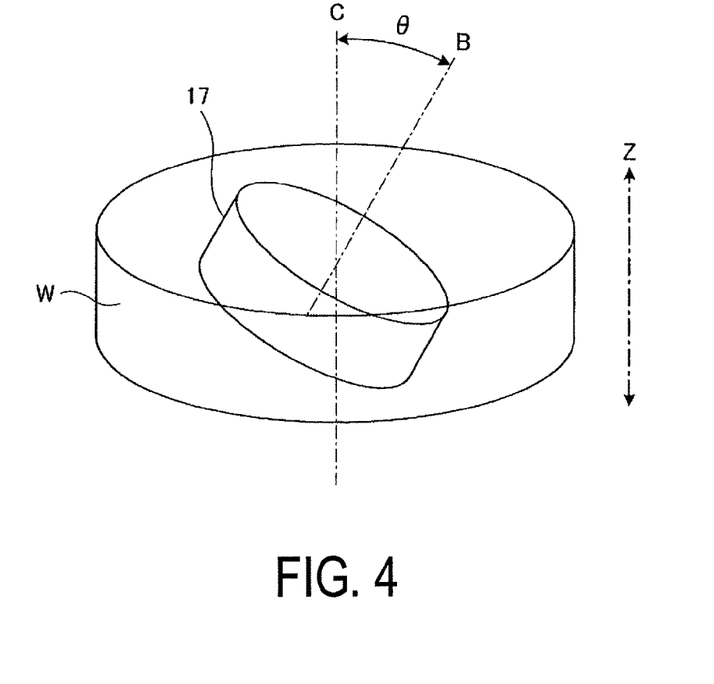
FIG. 4 is a schematic perspective view for describing the cutter position during rough cutting according to an embodiment of the present invention.
Figure 5:
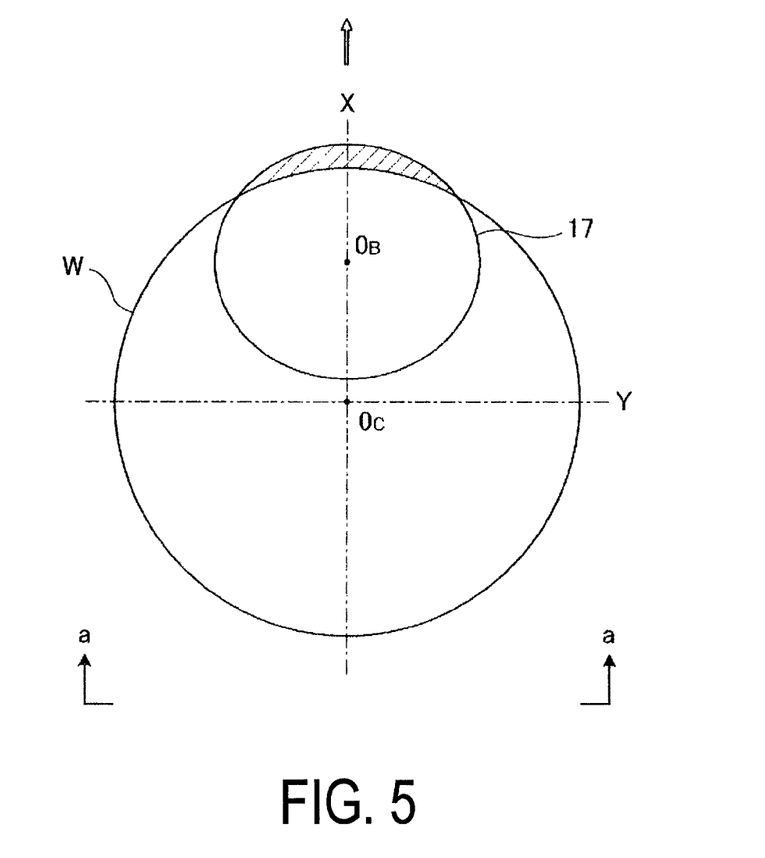
FIG. 5 is a schematic plan view for describing the cutter position during rough cutting according to an embodiment of the present invention.

FIG. 4 is a schematic perspective view describing the position of the cutter 17 during rough cutting, and FIG. 5 is a schematic plan view describing the position of the cutter 17 during rough cutting (FIG. 4 corresponds to a view as seen from the direction a-a in FIG. 5). As illustrated in FIG. 4, the crossed axis angle during rough cutting (angle of intersection between the cutter axis B and the workpiece axis C) is θ. The shaded portions in FIG. 5 represent the cutting region during rough cutting, the outline arrow indicates the cutting direction during rough cutting, $O_B$ represents the center position of the cutter 17 passing through the cutter axis B, and $O_C$ represents the center position of the workpiece W passing through the workpiece axis C. Furthermore, the x-, y-, and z-axis in FIG. 4 and FIG. 5 correspond to the x-, y-, and z-axis in FIG. 1.

Figure 6:
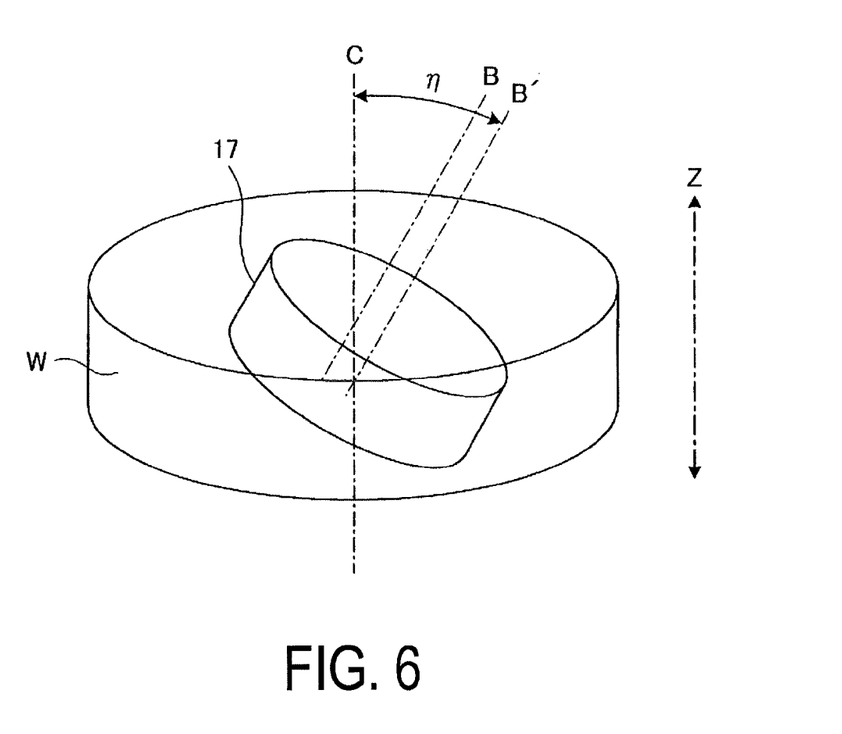
FIG. 6 is a schematic perspective view for describing the cutter position during finish cutting according to an embodiment of the present invention.
Figure 7:
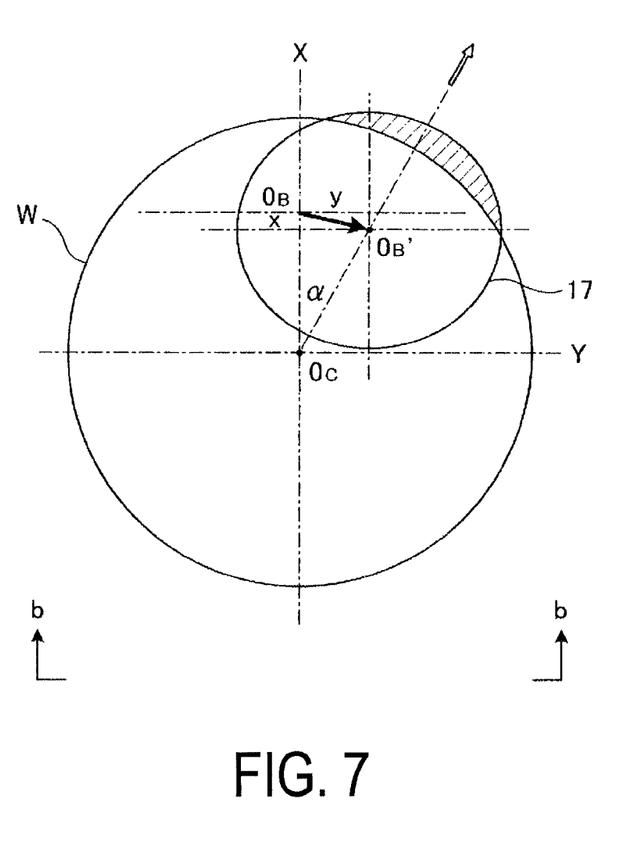
FIG. 7 a schematic plan view for describing the cutter position during finish cutting according to an embodiment of the present invention.

FIG. 6 is a schematic perspective view describing the position of the cutter 17 during finish cutting, and FIG. 7 is a schematic plan view for describing the position of the cutter 17 during finish cutting (FIG. 6 corresponds to the view seen from the b-b direction in FIG. 7). The shaded portions in FIG. 7 represent the cutting region during finish cutting, the outline arrow indicates the cutting direction during finish cutting, $O_B$ represents the center position of the cutter 17 passing through the cutter axis B (during rough cutting), and $O_C$ represents the center position of the workpiece W passing through the workpiece axis C. Furthermore, the x-, y-, and z-axis in FIG. 6 and FIG. 7 correspond to the x-, y-, and z-axis in FIG. 1.

As illustrated in FIG. 7, the center position $O_B$ of the cutter 17 during rough cutting moves at an angle α in the tangential direction of the workpiece W around the center position $O_C$ of the workpiece W, and finish cutting is performed at the position of $O_B'$ (at this time, the cutter axis B moves to the position B' as illustrated in FIG. 6).

In other words, after performing rough cutting (at a crossed axis angle θ to the cutter axis B), the cutter axis B is moved parallel by the amount of angle α around the workpiece, axis C with regard to the XY plane (plane orthogonal to the workpiece axis C). At this time, the crossed axis angle also changes. The cross axis angle at this time is η. Incidentally, as can be seen from FIG. 4, the upper surface of the cutter 17 is inclined to the right side in FIG. 5. In this case, the angle α refers to the angle in the clockwise direction from the position during rough cutting in the XY plane, as illustrated in FIG. 7. In other words, the angle α refers to the angle spanning from the position during rough cutting toward the direction that the upper surface of the cutter 17 inclines.

Figure 8:
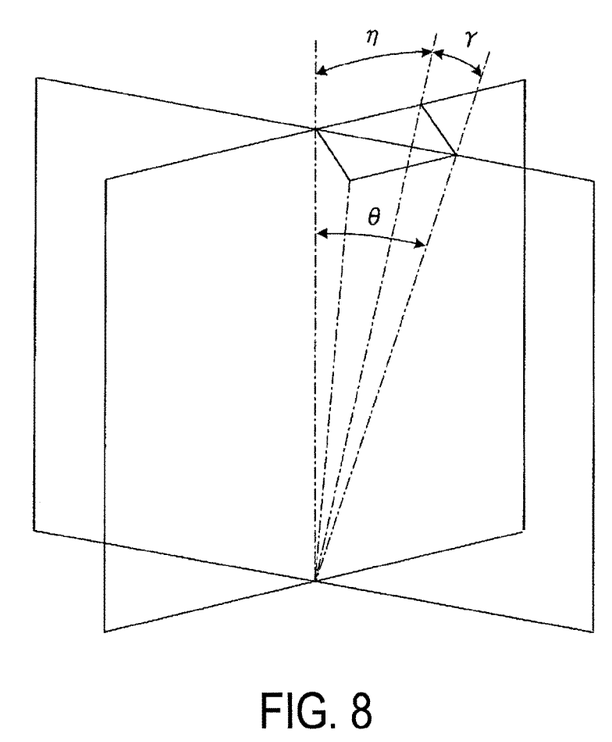
FIG. 8 is a concept diagram ascribing the relationship between $\theta$, $\eta$, and $\gamma$ in an embodiment the present invention.

Incidentally, as illustrated in the concept diagram of FIG. 8, θ can be split into angular components γ and η. Therefore, when changing the crossed axis angle from θ to η, the inclination of the cutter 17 automatically becomes γ (details provided in the following description of FIG. 10). The change to the cutting process thereby is described below using FIG. 9 and FIG. 10. Incidentally, as described below, the angular difference between θ and η in the present embodiment is a very small value (within the allowable tolerance), so there is no problem with cutting precision.

Figure 9:
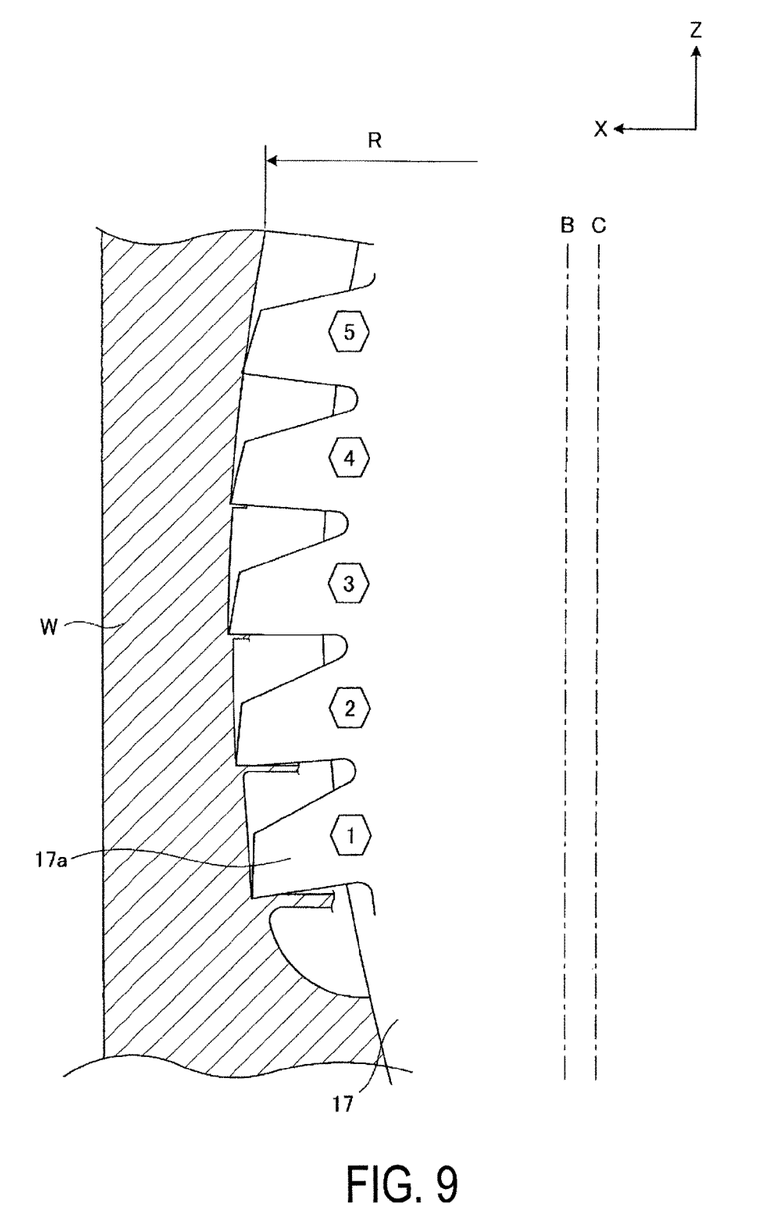
FIG. 9 is an enlarged cross-sectional view of the cutting region during rough cutting according to an embodiment of the present invention.
Figure 10:
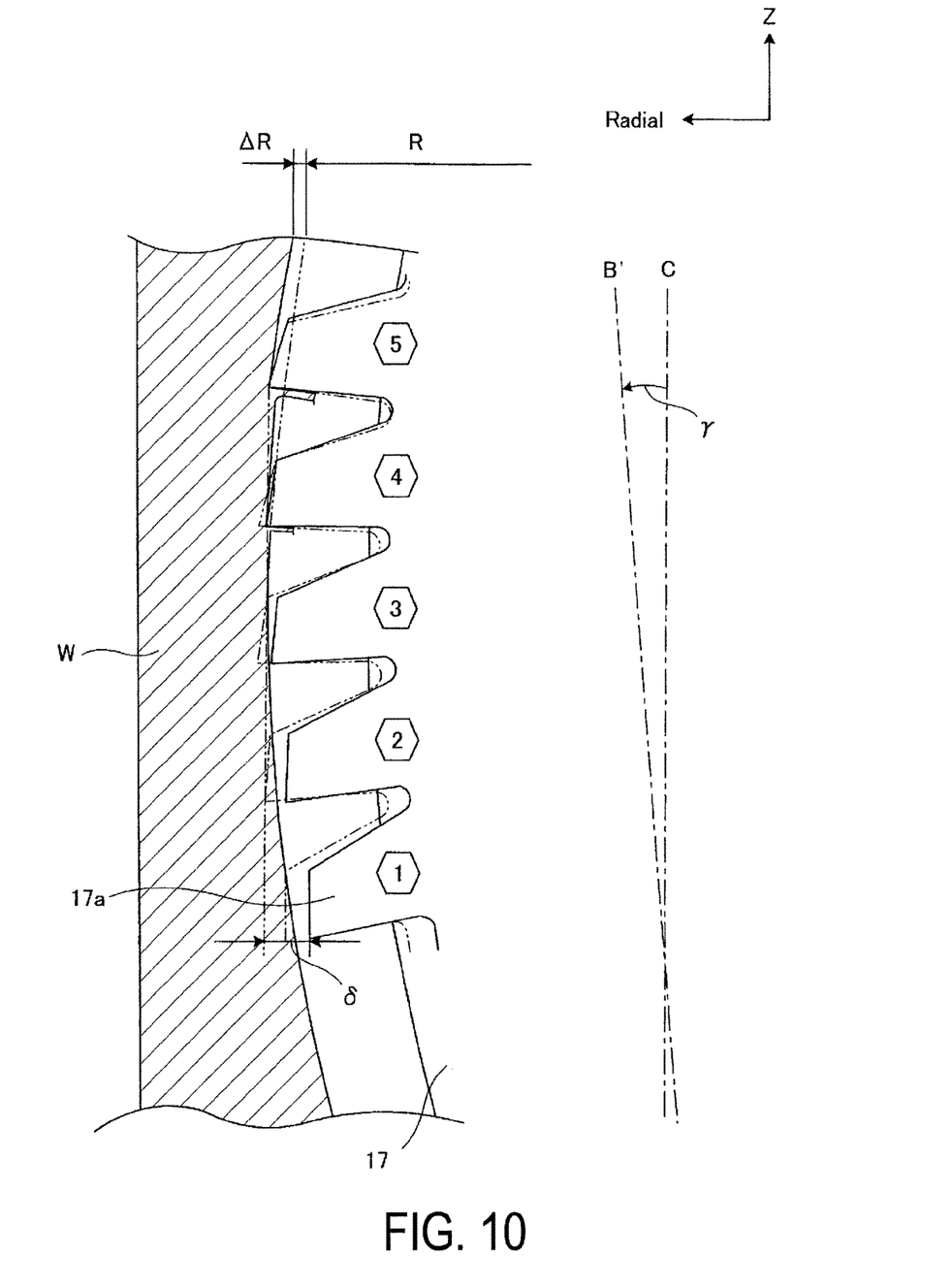
FIG. 10 is an enlarged cross-sectional view of the cutting region during finish cutting according to an embodiment of the present invention.

FIG. 9 is an enlarged cross-sectional view of the cutting region during rough cutting, and FIG. 10 is an enlarged cross-sectional view of the cutting region during finish cutting. The values surrounded by a hexagonal shape in FIG. 9 and FIG. 10 indicate the order of the cutting blades 17a of the cutter 17 in the cutter width direction (or the tooth trace direction). For example, "1" in the diagram refers to the first stage cutting blade 17a from a lower surface of the cutter 17, and similarly, "2" refers to the second stage cutting blade 17a.

Furthermore, R represents the radial cutting depth (cutting depth in the radial direction of the workpiece W). Furthermore, in FIG. 9 and FIG. 10, the cutter axis B, B' and the workpiece axis C are marked with a single dot dashed line. However, the cutter axis B, B' and the workpiece axis C in FIG. 9 and FIG. 10 are marked so that the angle can be easily understood, but the position is not accurate. Furthermore, the cutter axis B, B' is precisely indicated by a line projected onto the plane (paper surface) of FIG. 9 and FIG. 10 (in other words, the cutter axis B, B' is actually inclined in the direction orthogonal to the paper surface). Incidentally, in FIG. 10, the position of the front cutting blade 17a (during rough cutting) where the cutter 17 has an inclination of γ is indicated by the double dot dashed line.

As illustrated in FIG. 9, first, when rough cutting at a crossed axis angle θ by the cutter 17, the cutting blades 17a contribute to cutting in order from the first stage to the fourth stage, and the fifth stage cutting blade 17a does not contribute to cutting. The cutting amount at this time is indicated by R, and the cutting direction (radial direction) is in the x-axis direction (refer to FIG. 5). Furthermore, at this time, the cutter axis B projected on the XZ plane that includes the x-axis and the z-axis (in actuality inclined in the y-axis direction) is parallel to the workpiece axis C.

Herein, the cross axis angle changes from θ to η as the cutter axis B of the cutter 17 moves by the angle α (FIG. 7) in the tangential direction (FIG. 6, FIG. 8). Therefore, as illustrated in FIG. 10, the cutter axis changes from B to B', and the cutter axis B' projected on the plane that includes the z-axis and the radial direction (in actuality inclined in the direction orthogonal to the paper surface) is inclined regard to the workpiece axis C. This inclination is γ. Incidentally, after moving by angle α, the cutting direction (radial direction) changes and does not match the x-axis direction (refer to FIG. 7).

From this condition, if radial cutting is followed by finish cutting such that ΔR is added (R+ΔR), the first to third stage cutting blade 17a will not contribute to cutting, and the fourth and fifth stage cutting blades 17a will contribute to cutting in order, as illustrated in FIG. 10.

With the present embodiment, the different in the amount of radial cutting of the cutting blade 17a of the fifth stage from the lower surface of the cutter 17 (highest stage of the cutter 17) and the cutting blade 17a of the first stage (lowest stage of the cutter 17) is δ. The angle α is determined from the perspective of obtaining the desired δ, in order to distinguish between the cutting blade 17a on the upper surface side of the cutter 17 and the cutting blade 17a on the lower surface side of the cutter 17, during rough cutting and during finish cutting.

The value δ can be approximately 0.3 mm. In this case, the difference between η and θ can be maintained within the allowable tolerance range as described by the following calculation, and therefore there is no problem with the cutting precision.

Incidentally, in actuality, the value of angle α is not input, but rather the angle α of the cutter 17 is changed by inputting the value for the amount of movement x in the x-axis direction, and the amount of movement y in the y-axis direction.

For example, if the diameter of the workpiece W is 160 mm, the diameter of the cutter 17 is 80 mm, and the cutter width (length in the axial direction) is 30 mm, θ=25°, and α=1°.

$$\eta = \mathrm{atan}(\tan 25° \cdot \cos 1°)$$
$$= 24.997°$$

$$\gamma = \mathrm{atan}(\tan 25° \cdot \sin 1°)$$
$$= 0.466°$$

The difference δ in the radial cutting amount between the highest stage cutting blade 17a and the lowest stage cutting blade 17a of the cutter 17 is $$\delta = (30\ \mathrm{mm}/\cos 24.997°) \cdot \sin 0.466°$$
$$= 0.269\ \mathrm{mm}$$

from the cutter width 30 mm.

Incidentally, the amount of movement (x, y) of the center position of the cutter 17 is $$x = 40\ \mathrm{mm} \cdot \sin 1°$$
$$= 0.698\ \mathrm{mm}$$
$$y = 40\ \mathrm{mm} \cdot (1 - \cos 1°)$$
$$= 0.006\ \mathrm{mm}$$

Based on the above calculation, in order to achieve δ=0.269 mm, a should be set to 1° (x=0.698 mm, y=0.006 mm), and in this case, the difference between the crossed axis angle θ during rough cutting and the crossed axis angle η during finish cutting will be a mere 0.003° (=25°−24.997°).

Incidentally, the combination of cutting blades 17a that contribute during rough cutting and finish cutting is simply an example, and this combination can be changed by changing δ.

Next, the operation of the gear cutting device 1 is described. Incidentally, the following operation is controlled by the NC controller 20.

First, rough cutting is performed on the workpiece W. Initially, the cutter 17 is swiveled around the cutter swivel axis A of FIG. 1 to provide a crossed axis angle θ to the cutter axis B. Furthermore, the cutter 17 is moved in the x-, y-, and z-axis directions so as to engage with the workpiece W as illustrated in FIG. 2 and FIG. 3.

Furthermore, when the cutter 17 and the workpiece W are engaged, the cutter 17 is rotated around the cutter axis B, the workpiece W is rotated around the workpiece axis C, and thus cutting in the x-axis direction and feeding in the z-axis direction are provided to the cutter 17. In other words, the cutter 17 and the workpiece W are engaged and rotated, and the cutter 17 is made to cut in the x-axis direction while being reciprocally moved in the z-axis direction.

Therefore, as illustrated in FIG. 9, rough cutting of the workpiece W is performed only by the first to fourth stage cutting blades 17a from the lower surface of the cutter 17.

Next, finish cutting is performed on the workpiece W. After rough cutting, the cutter 17 was moved in the x- and y-axis direction by the column 12 and the slide head 15 in order to achieve the angle α of movement in the tangential direction to obtain the desired δ illustrated in FIG. 10, the workpiece W is engaged and rotated, and the cutter 17 performs radial cutting while being reciprocally moved in the z-axis direction. Incidentally, during finish cutting, radial cutting is performed at R+ΔR as illustrated in FIG. 10. Incidentally, radial cutting of the cutter 17 is achieved by the operation of the column 12 and the slide head 15.

Therefore, as illustrated in FIG. 10, finish cutting of the workpiece W is performed only by the fourth and fifth stage cutting blades 17a from the lower surface of the cutter 17.

Note that the cutter 17 that reciprocally moves in the z-axis direction cuts the workpiece W when moved downward during rough cutting and finish cutting, but is separated from the workpiece W in the x-axis direction and does not make contact when being moved upward.

In this manner, with the present embodiment, the cutting blade 17a or the combination of cutting blades 17a that contribute to cutting during rough cutting and finish cutting is changed by using a multi-blade form cutter 17, and wear is dispersed among the blades, which can extend the service life of the tool.

Incidentally, with the present embodiment, the cutter 17 was described as having a barrel shape, but the present invention is not limited to this configuration, and the cutter 17 may have a cylindrical shape, for example. Furthermore, with the present embodiment, the case of cutting an internal gear was described, but the present invention is not limited to this configuration, and can also be applied to cutting of an external gear.

Furthermore, with the present embodiment, the case where the cutter axis is moved by an angle α in the tangential direction of the workpiece W after rough cutting was described, but this was in order to achieve the angle α by movement in the x-, y-axis direction, and therefore there is no need to separately provide a new swivel mechanism for the cutter 17 (in the tangential direction), and there will not be additional cost. However, this type of swivel mechanism may be provided.

Therefore, with the present embodiment, gear cutting can be performed with high precision and high efficiency while being able to expand the service life of the tool.

INDUSTRIAL APPLICABILITY

The present invention is applicable to a gear cutting machine and method.

REFERENCE SIGNS LIST

1 Gear cutting machine
11 Bed
12 Column (cutter cutting means)
13 Saddle (cutter feeding means)
14 Swivel head (swivel means, crossed axis angle setting means
15 Slide head (cutter moving means)
16 Cutter head
16a Main shaft
17 Cutter
17a Cutting blade
18 Rotary table (workpiece rotating means)
19 Attachment jig
20 NC controller (controlling means)
A Cutter swivel axis
B Cutter axis
C Workpiece axis
W Workpiece (inner gear for cutting)

The invention claimed is:

1. A gear cutting machine that cuts gears to be cut using a gear shaped cutter, by engaging and rotating a gear to be cut that can rotate around a workpiece axis and a gear shaped cutter that can rotate around a cutter axis, while cutting and feeding the gear shaped cutter, comprising:
- a swivel head that provides a crossed axis angle of the cutter axis to the workpiece axis;
- a column that moves the gear shaped cutter in the cutting direction during rough cutting, orthogonal to the workpiece axis direction;
- a slide head that moves the gear shaped cutter in a direction orthogonal to the cutting direction and the workpiece axis direction;
- a saddle that moves the gear shaped cutter in the feeding axis direction parallel to the workpiece rotating axis direction; and
- a controller that controls rough cutting to provide a cross axis angle to the cutter axis and moving the cutter axis around the workpiece axis parallel to a predetermined angle with regard to a plane that intersects with the workpiece axis from the position of the rough cutting using the column and the slide head, and controlling so that finish cutting is performed such that the cutter axis projected on a plane that includes the feeding axis direction and the cutting direction after moving has an angle with regard to the workpiece axis.

2. The gear cutting machine according to claim 1, wherein the blade of the gear shaped cutter is made of a plurality of cutting blades provided in a tooth trace direction, and the controller sets the predetermined angle such that the cutting blade or combination of cutting blades that contribute to cutting are changed for rough cutting and finish cutting.

3. A gear cutting method for gear cutting gears to be cut using a gear shaped cutter, by engaging and rotating a gear to be cut that can rotate around a workpiece axis and a gear shaped cutter that can rotate around a cutter axis, while cutting and feeding the gear shaped cutter, comprising:
- rough cutting at a cross axis angle to the cutter axis, then moving the cutter axis by moving a predetermined angle around the workpiece axis, and performing finish cutting such that the cutter axis has an angle with regard to the workpiece axis in a plane that includes the feeding axis direction parallel to the workpiece rotating axis direction and the cutting direction after moving.

4. The gear cutting method according to claim 3, wherein the blade of the gear shaped cutter is made of a plurality of cutting blades provided in a tooth trace direction, and predetermined angle such that the cutting blade or combination of cutting blades that contribute to cutting are changed for rough cutting and finish cutting.

* * * * *